Figure 1:
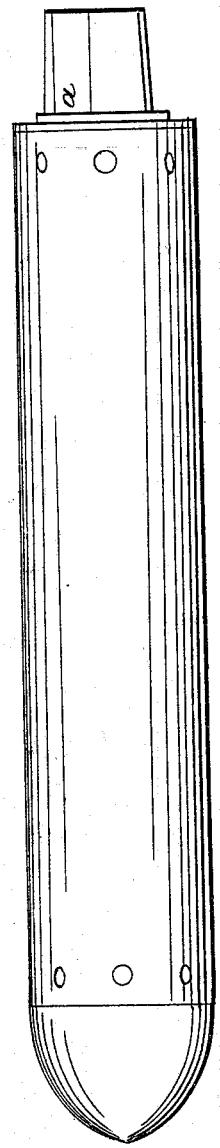

W. HALE.
Rocket.

No. 53,933. Patented Apr. 10, 1866.

UNITED STATES PATENT OFFICE.

WILLIAM HALE, OF LONDON, ENGLAND.

IMPROVEMENT IN ROCKETS.

Specification forming part of Letters Patent No. 53,933, dated April 10, 1866.

*To all whom it may concern:*

Be it known that I, WILLIAM HALE, of 6 John Street, Adelphi, London, England, have invented a new and useful Improvement in Rockets; and I do hereby declare the nature of my said invention and in what manner the same is to be performed to be particularly described and ascertained in and by the following statement thereof—that is to say:

The object of my present improvements in rockets is to obtain a more rapid rotation in the rocket, and thereby insure a more correct line of flight and longer range, than has hitherto been attained, and also to obviate a practical difficulty that exists in my late improvements, patented in England on the 25th of April, 1862, No. 1,220, wherein I represent the whole power of the gas generated by the combustion of the composition as exerting its full force to impel the rocket forward; but a proportion only of about one-half of this power I represent to be used in generating the rotary motion; whereas in my present improvements the whole power of the gas produces rotary motion without detracting from its effect in impelling the rocket forward.

I accomplish this improvement by dispensing with the central aperture represented in my last patent, from which the egress of the gas has no other effect than to propel the rocket forward, and thus a great part of the force of the gas is ineffectual to give rotary motion; and in the before-mentioned arrangement the three apertures with half-tubes projecting had to be placed so far distant from the axis of the rocket as to render it necessary to rivet in the cast-iron base (having the three apertures and central aperture formed in one piece) after the rocket was charged—an operation which was liable to loosen the composition from the inside of the case, and so materially injure the rocket.

In my present improvement, by dispensing with the central aperture and bringing the three apertures with the half-tubes near the axis of the rocket and making this part a separate casting, I am able to rivet in the base of the rocket before charging. The central part the base is previously bored out and tapped to receive the separate casting, upon which a thread is cut to suit, and thus the separate casting can be screwed in at any time after the rocket in charged. In charging the rocket a plug the thickness of the base is inserted in the central aperture for the purpose of filling up this aperture for the time, and it is afterward withdrawn and the rocket bored up in the ordinary way. By adopting this plan the composition, after being driven, remains perfectly undisturbed, and the difficulty referred to as existing in my last patent entirely obviated.

In order that my invention may be fully understood and readily carried into effect, I will proceed to describe the drawings hereunto annexed.

The drawings show the several parts of a rocket constructed in the manner I prefer for carrying out my invention.

Figure 4:
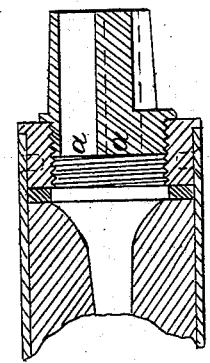
Figure 3:
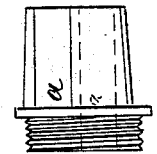
Figure 2:
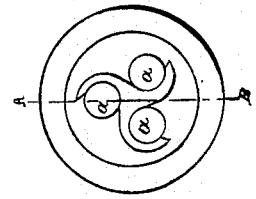

Figure 1 represents an external view of the case or body a rocket, to one end of which the shot, shell, or other head is fixed by rivets, screws, or otherwise, and at the other end the base-piece is similarly fixed, which may be cast or wrought iron, or it may, if preferred, be welded in the case. Fig. 2 represents an end view of the base-piece and rotator. The base-plate is bored out centrally and tapped to receive what I term the "rotator." Fig. 3 represents a side view of the rotator. I give it this name because it is the mechanical agent by which the rocket is caused to rotate rapidly about its longitudinal axis, as hereinafter explained. Fig. 4 shows a section of the rear end of a rocket-case and rotator.

On the rotator a screw is cut corresponding with the female screw in the center of the base piece or plate, into which it is so be screwed when the rocket is ready to be fired. In the rotator are three circular apertures, $a\ a\ a$, near the center, equidistant from each other and parallel with the longitudinal axis of the rocket. From these apertures three half-tubes project in the same line, which correspond with the three bored apertures. The gas generated by the combustion of the composition being allowed only to escape from the three apertures $a\ a\ a$, it will, by its elastic force, exert a lateral pressure against the projecting half-tubes, while it is free to expand on the opposite side, and (this unbalanced pressure being in a direction at right angles to the rocket's longitudinal axis) a rapid rotary motion is thereby given to the rocket. The base piece or plate being affixed before the rocket is charged and the composition driven upon it, the difficulty existing in my former rocket is obviated. At the same time (as the gas is allowed only to pass through the three apertures *a a a*) the whole force of the gas is effective to generate rotatory motion, while it exerts its entire force in generating rectilinear motion, and by this means greater rotation is given to the rocket than with the same power was effected by my former improvements.

What I claim as my invention, and desire to secure by Letters Patent, is—

The application of the principle by which the expansion of the whole volume of the gas as it issues from the vent is made to subserve the purpose of producing rotation in the rocket about its longitudinal axis, substantially as described.

In witness whereof I, the said WILLIAM HALE, have hereunto set my hand and seal this 27th day of January, in the year of our Lord 1866.

WM. HALE. [L. S.]

Witnesses:
   JOSHUA NUNN,
      *Deputy Consul,*
   F. W. ATKINSON,
      *Consulate, U. S. A., London.*